United States Patent [19]

Nakajima et al.

[11] Patent Number: 4,615,600
[45] Date of Patent: Oct. 7, 1986

[54] CAMERA OF THE AUTOMATIC APERTURE CONTROL TYPE

[75] Inventors: Yukio Nakajima, Kanagawa; Tatsuji Higuchi, Akikawa; Yasuo Asakura, Hachioji, all of Japan

[73] Assignee: Olympus Optical, Co. Ltd., Tokyo, Japan

[21] Appl. No.: 668,416

[22] Filed: Nov. 5, 1984

[30] Foreign Application Priority Data

Jan. 13, 1984 [JP] Japan ................................ 59-4573

[51] Int. Cl.⁴ .............................................. G03B 7/085
[52] U.S. Cl. ...................................... 354/451; 354/448
[58] Field of Search ....................... 354/435–437, 354/439–441, 446, 448, 451–453, 455, 443, 271.1, 444

[56] References Cited

U.S. PATENT DOCUMENTS 3,864,700  2/1975  Mielke ................................ 354/448
3,987,460 10/1976  Ueda et al. ......................... 354/448

Primary Examiner—William B. Perkey
Attorney, Agent, or Firm—Louis Weinstein

[57] ABSTRACT

A camera of the automatic aperture control type permits stop-down means which operates a diaphragm in cooperation with a shutter release operation first to move forward from a first position corresponding to the open aperture to a second position corresponding to a minimum aperture and then to move back from the second position toward the first position. The camera includes storage means for storing a position occupied by the stop-down means when the diaphragm assumes a proper aperture while the stop-down means moves from the first position to the second position so that the stop-down means is stopped at the stored position while the stop-down means moves back from the second position toward the first position.

13 Claims, 12 Drawing Figures

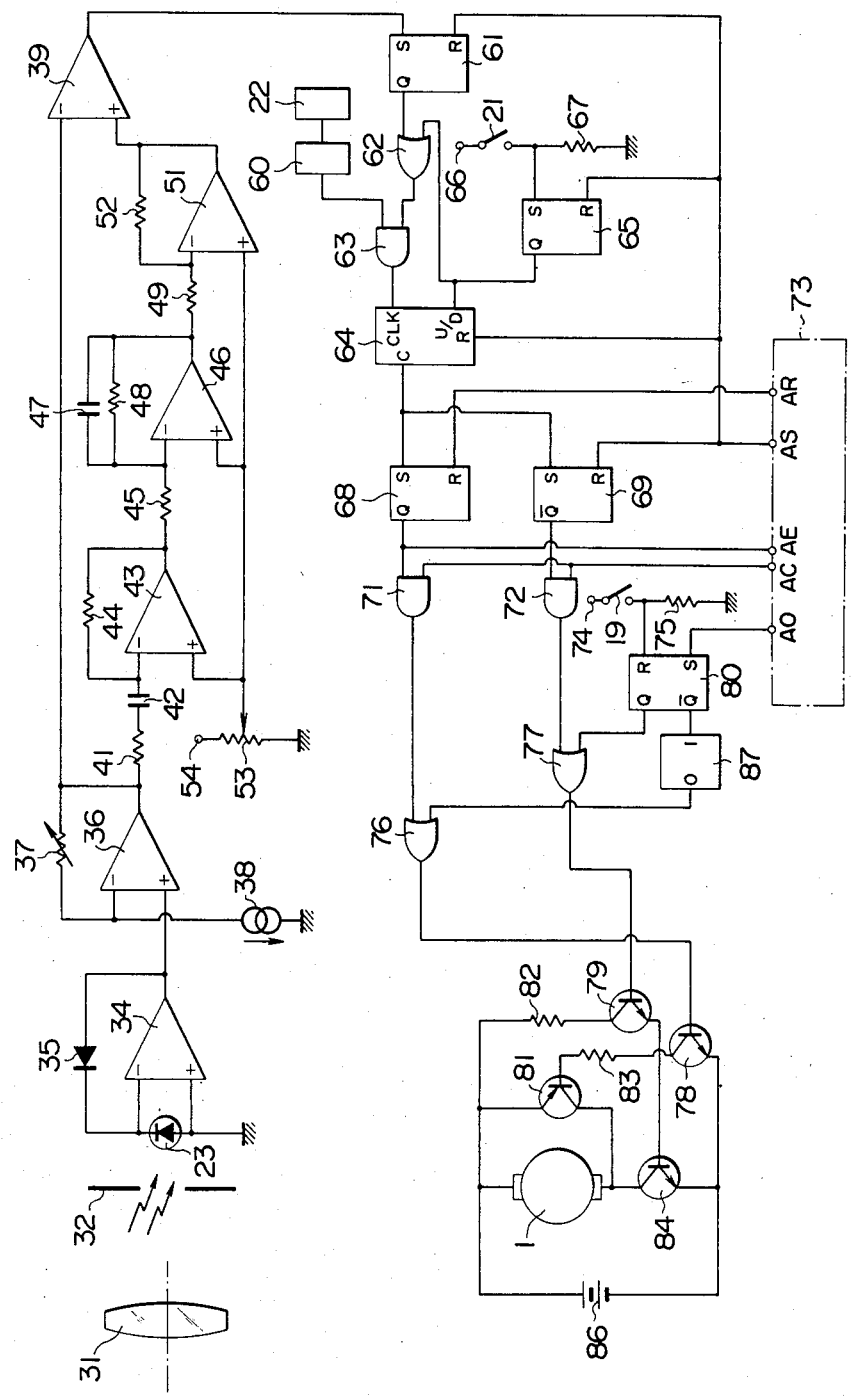
F I G. 4

CAMERA OF THE AUTOMATIC APERTURE CONTROL TYPE

BACKGROUND OF THE INVENTION

The present invention relates to a camera of the automatic aperture control type, and more particularly, to a camera of the automatic aperture control type adapted to drive a diaphragm provided on an interchangeable taking lens barrel from a camera body side.

When an automatic exposure of the shutter speed priority type or the program type is effected with a camera on which an interchangeable taking lens barrel (hereinafter referred to simply as an interchangeable lens) is mounted, it is necessary to make a proper calculation based on signals which are detected as by a TTL photometric apparatus provided on a camera body, to transmit a calculated aperture to the interchangeable lens and to then set a diaphragm of the interchangeable lens to the calculated aperture.

As means for transmitting the calculated aperture, it is prevalent that a stop-down member provided on the camera body to be activated by a shutter release operation and a diaphragm lever provided on the interchangeable lens for operating the diaphragm are both interconnected with each other so that the aperture calculated on the camera body side is transmitted to the interchangeable lens. However, when the stop-down member or the diaphragm lever is operated, the relationship between a rotational angle thereof and an F number of the interchangeable lens varies depending upon the interchangeable lens. Specifically, the relationship is not in a linear proportion as shown in curves $a_0$, $b_0$ (FIG. 1A) or has the different properties as shown in the curve $a_0$ or $b_0$ according to interchangeable lenses. Thus, this difference is caused between the rotational angle of the stop-down member and an aperture obtained thereby (that is, a real aperture) for each interchangeable lens. In other words, even when the calculated aperture is set to the interchangeable lens, the aperture can not be set into another interchangeable lens. To overcome the disadvantage, a special device must be planned that when the stop-down member or the diaphragm lever is rotated, the relationship between the rotational angle and F number is made in a linear proportion, as shown in FIG. 1B, and the diaphragm is set just as calculated even when an interchangeable lens is changed. Alternatively, an interchangeable lens must be employed which has a separate mount capable of effecting an aperture control of the shutter speed priority type or the program type. Accordingly, even when a camera body of either the shutter speed priority type or the program type is newly procured utilizing an interchangeable lens of only the conventional aperture priority type, the combination of the interchangeable lens and the camera body can not satisfy the essential functions of the shutter speed priority type or the program type.

Furthermore, as shown in FIG. 2A, even when a proper aperture is calculated as by TTL photometry, a proper exposure is not performed due to a time lag in the follow-up operation of the stop-down member or a time lag in operation of the stop-down member after a terminate signal is given thereto. For example, even when an exposure is to be made with a proper aperture as indicated by a point "$A_1$", it may be made in practice with a different aperture as indicated by a point "$A_2$".

SUMMARY OF THE INVENTION

It is an object of the present invention to provide a camera of the automatic aperture control type which is adapted to be capable of effecting an accurate aperture control to an interchangeable lens for use in all kinds of single lens reflex cameras which are presently available without being subject to the influence of a nonlinearity relationship between a calculated rotational angle of the stop-down member and a real aperture, which nonlinearity is caused whenever an interchangeable lens is changed, and with reduction of influences such as a time lag in the follow-up operation of an aperture drive system.

The present invention is characterized in that a diaphragm is first driven from its maximum open aperture to its minimum aperture by means of the stop-down member, during which a position of the stop-down member where a proper aperture is obtained is stored which aperture is calculated from TTL photometry, a film sensitivity and the like, and subsequently the stop-down member is stopped when the stored proper aperture is resumed by reversely driving the diaphragm to the open aperture.

According to the present invention, since the stop-down member is driven such that the diaphragm is first stopped down from its open aperture to its minimum aperture and the number of stop-down steps is then determined in accordance with variation in the diaphragm aperture, a conventional interchangeable lens is applicable as it is to a camera body of the shutter speed priority type or the program type and an exposure can be made with a reduced deviation from the proper aperture.

BRIEF DESCRIPTION OF THE DRAWINGS

FIG. 4 is a circuit diagram of the camera shown in FIG. 3;

DESCRIPTION OF PREFERRED EMBODIMENTS

Prior to the description of preferred embodiments, the principle of the present invention will be explained.

Figure 1A:
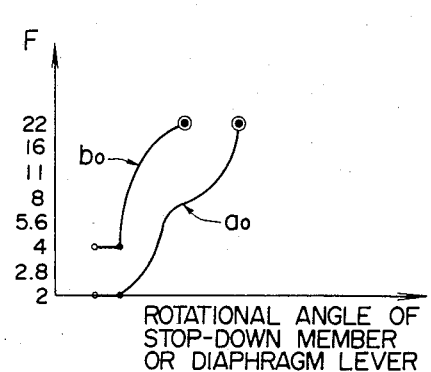
FIG. 1A is a diagram illustrating the difference between the F number and rotational angle of a stop-down member.
Figure 1B:
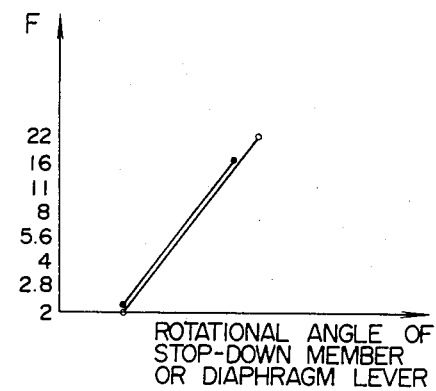
FIG. 1B is a diagram illustrating no difference between the F number and rotational angle of the stop-down member.
Figure 2A:
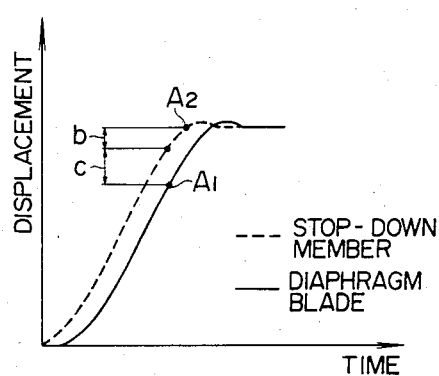
FIG. 2A is a diagram illustrating that a time lag in the follow-up is caused with a conventional stop-down device.

Considering a conventional process from after determination of an aperture to an exposure, a stop-down member on a camera body is first driven and this movement is transmitted to a diaphragm lever provided on the interchangeable lens, during which a quantity of light is detected as by TTL photometry. Accordingly, when an aperture $A_1$ to be set is obtained a stop-down terminate signal is given to terminate the stop-down operation and the exposure is then effected. However, when the stop-down operation is terminated by detecting the stop-down terminate signal, as shown in FIG. 2A, a time lag in operation of the stop-down member such as denoted by "b" is first caused until the stop-down member is stopped and a time lag in the follow-up operation such as denoted by "c" is further caused between the stop-down member and a diaphragm blade, resulting in the total time lag denoted by "b+c". As a consequence, even when the terminate signal is given by detecting the light quantity corresponding to the aperture $A_1$, a diaphragm aperture is at a position where a light quantity corresponding to an aperture $A_2$ is obtained.

Figure 2B:
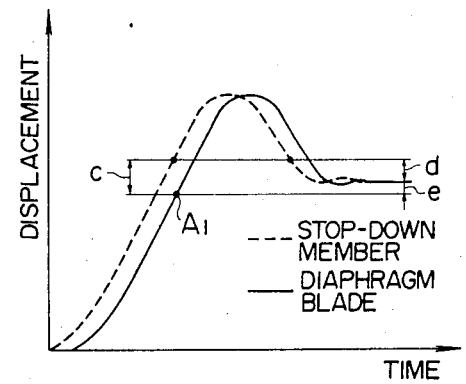
FIG. 2B is a diagram illustrating that the time lag can be reduced according to the present invention.

In contrast to the foregoing, the apparatus of the present invention drives the diaphragm from its maximum aperture to its minimum aperture, during which time an aperture to be set is calculated and a detection signal is produced. Even after the detection signal is produced, the stop-down member is uninterruptedly driven to stop down the diaphragm to its minimum aperture, during which the operational positions of the stop-down member are stored. For example, let it be supposed that a time period required to reach the minimum aperture starting from the time when the detection signal has been produced is counted by using a counter and the counter counts the number of times "N". Subsequently, the diaphragm is driven from its minimum aperture to its open aperture, during which the number "N" previously counted is reduced to the number "0" to stop the stop-down member at the position in which the count number is "0". As a consequence, as shown in FIG. 2B, when a signal is produced by detecting a light quantity corresponding to an aperture $A_1$, the time lag in the follow-up operation as indicated by "c" is caused between the stop-down member and the diaphragm blade as in the prior art. However, even though a terminal signal of stopping the stop-down member is given, the time lag in operation of the stop-down member as indicated by "d" is caused until the stop-down member is stopped in practice. The resulting time lag is "c−d=e" which is extremely reduced. In other words, the follow-up time lag between the stop-down member and the diaphragm blade is offset by the operational time lag in practically stopping the stop-down member after the terminate signal for the stop-down member is given.

A first embodiment of the present invention which is based on the foregoing principle will be described. The embodiment, which is applied to a single lens reflex camera, is essentially constructed by a mechanism as shown in FIG. 3 and an electric circuit as shown in FIG. 4.

Figure 3:
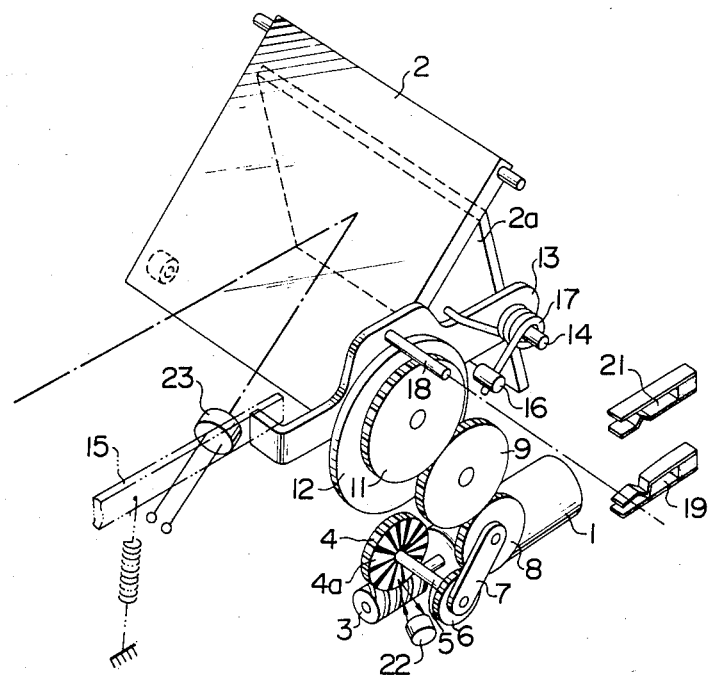
FIG. 3 is an enlarged perspective view of the essential parts of a camera of the automatic aperture control type according to an embodiment of the present invention.

Referring to FIG. 3, a motor 1 for driving a diaphragm is located below a main movable mirror 2 which is obliquely disposed with respect to the optical axis of a taking lens. On an output shaft outwardly extending from the motor 1 is integrally mounted a drive gear 3 comprising a worm gear. The drive gear 3 engages a gear 4 comprising a worm wheel. The gear 4 is fixed to one end of a rotary shaft 5 and an output gear 6 is fixed to the other end thereof. The gear 6 engages an intermediate gear 8 through an arm 7. The intermediate gear 8 further engages an idle gear 9 which engages a gear 11. The gear 11 is integrally and eccentrically coupled to a circular or an elliptic plate cam 12 for driving the diaphragm. In addition, a stop-down member 13 in the form of an arm which is convex in its middle part is swingably supported at its base end part on a stationary support 14. A diaphragm lever 15 provided on an interchangeable lens bears against the upper surface of an inwardly bent part which is formed at the front end of the stop-down member 13. A torsion spring 17 is held on the support 14 such that one end of the spring 17 is placed on the upper surface of the stop-down member 13 and the other end thereof is placed on a stationary pin 16 to urge the stop-down member 13 counterclockwise about the support 14. A follow-up pin 18 is arranged on the convex part of the stop-down member 13 in such a manner that the pin 18 is urged to bear against the peripheral surface of the plate cam 12 by the spring 17 which surface forms an operational cam surface. Further, leaf switches 19, 21 of the normally open type timely engage the free end of the pin 18 in such a manner that whenever the pin 18 comes to its lowmost position (bottom dead point) it engages the switch 19 and whenever the pin 18 comes to the highmost position (top dead point) it engages the switch 21 to close respective contacts of the switches 19, 21.

The gear 4 is provided with a pattern 4a on its side surface which pattern forms radially extending white and black bands of a given width and serves for detection of the number of revolutions of the motor 1. Specifically, the pattern 4a serves as a rotary encoder by intercommunicating with a photocoupler 22 which is disposed in opposing relationship with the pattern 4a so that the number of revolutions of the motor 1 can be stored in an electric circuit which will be described later. A total reflection mirror 2a is provided on the back of the main movable mirror 2 so as to permit part of light from an object to be photographed to reflect and to impinge on a photoelectric transducer 23 for photometry.

An electric circuit (FIG. 4) of the camera according to the first embodiment of the present invention employs an automatic exposure control system of the program type. The photoelectric transducer element 23 comprises an SBC (silicon blue cell) and the like which is disposed at a position in a camera body where light from an object to be photographed passing through both a taking lens 31 and a diaphragm 32 can be received. The transducer element 23 is connected between inverting and non-inverting input terminals of an operational amplifier 34 with the anode thereof pointing to the non-inverting input terminal. A diode 35 for logarithmic compression is connected between the inverting input terminal and an output terminal of the operational amplifier 34 with the anode thereof pointing to the output terminal. The non-inverting input terminal of the operational amplifier 34 is grounded and the output terminal thereof is connected to a non-inverting input terminal of an operational amplifier 36 of the next stage for introducing film sensitivity information. An inverting input terminal of the operational amplifier 36 is connected through a variable resistor 37 for setting a film sensitivity to an output terminal of the operational amplifier 36 and to a constant-current source 38 for supplying a constant-current to the variable resistor 37.

The output terminal of the operational amplifier 36 is connected to an inverting input terminal of a comparator 39 and to an inverting input terminal of an operational amplifier 43 through a resistor 41 and a capacitor 42. An output terminal of the operational amplifier 43 is connected through a resistor 44 to the inverting input terminal thereof. The non-inverting input terminal of the operational amplifier 43 is connected to non-inverting input terminals of operational amplifiers 46, 51 and is grounded through a movable contact piece of a variable resistor 53 for setting an open aperture limit. The other end of the variable resistor 53 is connected through a terminal 54 to a power supply. Further, the output terminal of the operational amplifier 43 is connected through a resistor 45 to an inverting input terminal of the operational amplifier 46 and to one end terminal of an integration circuit comprising a parallel combination of a capacitor 47 and a resistor 48. The other end of the combination of capacitor 47 and resistor 48 is connected to an output terminal of the operational amplifier 46. In addition, the output terminal of the operational amplifier 46 is connected through a resistor 49 to both an inverting input terminal of the operational amplifier 51 and one end of a resistor 52. The other end of the resistor 52 is connected to an output terminal of the operational amplifier 51 and further to a non-inverting input terminal of the comparator 39.

An output terminal of the comparator 39 is connected to the set terminal of a flip-flop circuit 61 (hereinafter referred to as FF). An output terminal of FF 61 is connected to one of the input terminals of an OR gate 62. The output terminal of the OR gate 62 is connected to one of the input terminals of an AND gate 63. An output terminal of the photocoupler 22 is connected to an input terminal of a waveform shaping circuit 60. An output terminal of the shaping circuit 60 is connected to the other one of the input terminals of the AND circuit 63. The output terminal of the AND circuit 63 is connected to the CLK terminal of an up-down counter 64. The U/D terminal of the up-down counter 64 is connected to both an output terminal of an FF 65 and the other one of the input terminals of the OR gate 62. One end of the leaf switch 21 is connected through a terminal 66 to the power supply and the other end thereof is connected to the set terminal of the FF 65 and to the ground through a resistor 67. Specifically, when the switch 21 turns on or off, the power voltage or earth potential is applied to the set terminal of the FF 65 and thus a signal of a high level (H) or a low level (L) is supplied to the U/D terminal of the counter 64, respectively. An output terminal C of the counter 64 is connected to set terminals of FFs 68, 69. An output terminal Q of FF 68 is connected to one of the input terminals of an AND gate 71 and to the AE terminal of a sequence control circuit 73. The inverting output terminal $\bar{Q}$ of FF 69 is connected to one of input terminals of the an AND gate 72. In addition, the AS terminal of the control circuit 73 is connected to reset terminals of FFs 61, 65, 69 and counter 64. The AR terminal of the control circuit 73 is connected to the reset terminal of FF 68. The AC terminal of the control circuit 73 is connected to the other input terminals of AND gates 71, 72. The AO terminal of the control circuit 73 is connected to the set terminal of FF 80. One terminal of the switch 19 is connected through a terminal 74 to the power supply. The other terminal of the switch 19 is connected to the reset terminal of FF 80 and to the ground through a resistor 75. The output terminal Q of FF 80 is connected to one of the input terminals of an OR gate 77. The inverting output terminal $\bar{Q}$ of FF 80 is connected to an input terminal of one-shot multivibrator 87 which produces the H level signal for a given time period. An output terminal of the multivibrator 87 is connected to one of the input terminals of OR gate 76. The other input terminal of OR gate 76 is connected to the output terminal of AND gate 71. The output terminal of OR gate 76 is connected to the base of an NPN type transistor 78. The collector of the transistor 78 is connected through a resistor 83 to the base of a PNP transistor 81. The positive pole of a d.c. power supply 86 is connected to the motor 1 and the emitter of the transistor 81 and to the collector of an NPN type transistor 79 through a resistor 82. The negative pole of the power supply 86 is connected to the emitters of an NPN type transistor 84 and the transistor 78. The emitter and base of the transistor 79 are connected to the base of the transistor 84 and to an output terminal of the OR gate 77, respectively.

Figure 5:
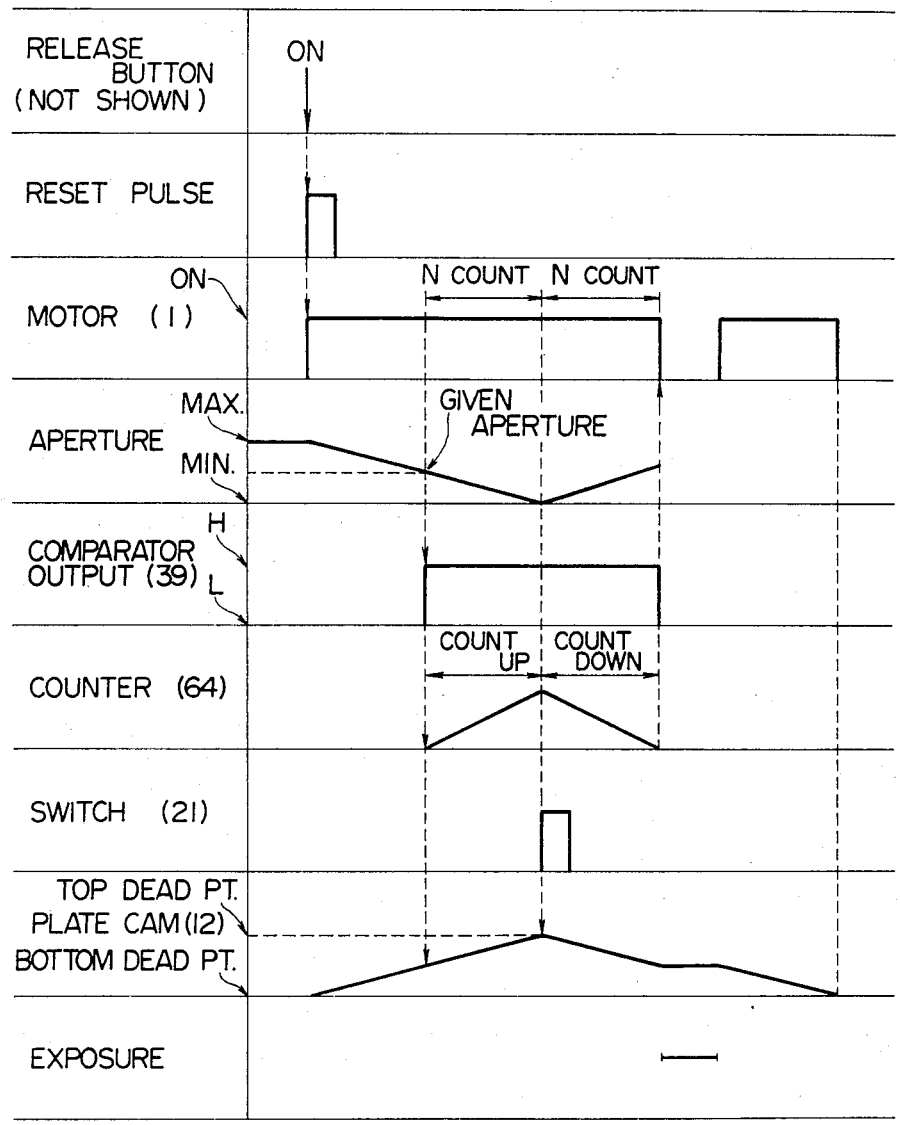
FIG. 5 is a time chart illustrating operations of the camera shown in FIGS. 3 and 4.

In operation, light passing through the lens 31 and the diaphragm 32 goes through the semi-transparent part of the mirror 2 and is reflected by the total reflection mirror 2a to impinge on the transducer 23 (FIGS. 3, 4). As a result, a voltage that a quantity of light is logarithmically compressed is produced from the output terminal of the operational amplifier 34. The addition of the logarithmically compressed voltage and a voltage which is set by both the constant-current source 38 and the variable resistor 37 is introduced as a voltage corresponding to information of the light quantity into the inverting input terminal of the comparator 39 as well as a stop-down voltage generator comprising the operational amplifiers 43, 46. In the stop-down voltage generator, only variation of the voltage corresponding to the light quantity information is detected by a differentiation circuit comprising the capacitor 42 and the operational amplifier 43 and is then integrated by the capacitor 47 to supply to the non-inverting input terminal of the comparator 39 as a voltage corresponding to variation of the diaphragm aperture. As will be noted from the time chart shown in FIG. 5, since the voltage corresponding to the light quantity information, before a release button (not shown) is depressed, is higher than the voltage corresponding to the variation of the diaphragm aperture, an output of the comparator 39 is at the L level.

When the release button is depressed, a reset pulse is applied from the output terminal AS of the sequence control circuit 73 to the reset terminals of FFs 61, 65, 69 and counter 64 to reset them to their initial conditions.

When the FF 69 is reset, the inverting output terminal $\bar{Q}$ thereof turns to the H level and the AC terminal of the control circuit 73 simultaneously turns to the H level. As a result, the AND gate 72 produces the H level signal and the output of the OR gate 77 turns to the H level to render the transistors 79, 84 conductive. Then, a current is supplied to the motor 1 to rotate it. Then, as shown in FIG. 3, the gears 4, 6, 8, idle gear 9 and the gear 11 rotate in a predetermined direction. As the gear 11 and plate cam 12 are united, the pin 18 which bears against the plate cam 12, with the rotation of the gear 11, is gradually raised from the bottom dead point to the top dead point and thereby the front end of the stop-down member 13 also is raised. Accordingly, the diaphragm lever 15 which is provided on the interchangeable lens and engages the front end of the stop-down member 13 is raised to initiate the stop-down operation. In addition, as the pattern 4a on the gear 4 rotates, the outputs of the photocoupler 22, which change with alternations of the H and L levels, are shaped by means of the waveform shaping circuit 60 and are then applied to one input terminal of the AND gate 63. However, since the L level output of the comparator 39 is applied through the FF 61 and OR gate 62 to the other input terminal of the AND gate 63 immediately after the initiation of stop-down operation, the output of the AND gate 63 remains at the L level.

With the advance of the stop-down operation, the voltage corresponding to variation of the diaphragm aperture increases gradually, while the voltage corresponding to the light quantity information decreases gradually. When the voltage corresponding to variation of the diaphragm aperture becomes larger than the voltage corresponding to the light quantity information, the output of the comparator 39 is inverted to the "H" level.

A quantity that the diaphragm has been stopped down until the output of the comparator 39 is inverted varies depending upon brightness of an object to be photographed. Specifically, the greater the brightness of an object to be photographed, the higher the voltage corresponding to the light quantity information, so that an output of the comparator 39 is not inverted until the diaphragm is largely stopped down. The less the brightness of an object to be photographed, the lower the voltage corresponding to the light quantity information, so that the output of the comparator 39 is inverted when the diaphragm is stopped down to a small extent. Accordingly, when a diaphragm aperture at the time the output of the comparator 39 is reversed is regarded as an aperture to be set, it will be noted that the aperture to be set is to be controlled in accordance with a program depending upon brightness of an object to be photographed. A more detailed description will be found in U.S. Pat. application No. 588,348, filed on Mar. 12, 1984, in the name of Miyasaka.

When the output of the comparator 39 is inverted to the "H" level, the output of the OR gate 62 also turns to the "H" level and an output of the AND gate 63 repeats with alternations of the "H" and "L" levels in accordance with an output of the photocoupler 22.

Then, the counter 64 starts counting and when the plate cam 12 reaches its top dead point (that is, the minimum diaphragm aperture) the front end of the pin 18 closes the leaf switch 21. Accordingly, an output of the FF 65 turns to the "H" level and the "H" level signal is supplied to the input terminal of the counter 64 to render it in the count-down mode. In other words, the number of counts of the counter 64 up to this time (N) is in proportion to the number of revolutions of the motor 1 from the time the diaphragm takes the aperture to be set to the plate cam 12 reaches the top dead point. The motor 1 runs on until the number N of counting becomes zero starting from the time in the count-down mode. When the count number becomes zero the output terminal C of the counter 64 turns to the "H" level to thereby set the FFs 68, 69. The output of the OR gate 76 turns to the "H" level and the output of the OR gate 77 turns to the "L" level. As a result, since the transistors 79, 84 are disabled, the power supply from the d.c. power supply 86 to the motor 1 is interrupted. Also, since the transistors 78, 81 are activated, the electromagnetic brake is applied to the motor 1 to stop it. Thus, the stop-down operation is terminated and a diaphragm aperture temporarily remains at the aperture to be set.

The completion of the stop-down operation is delivered to the control circuit 73 by the fact that the AE terminal of the circuit 73 turns to the "H" level. Then, this is detected by the control circuit 73 and the AR terminal of the control circuit 73 turns to the "H" level after a definite period sufficient to completely stop the motor 1 is secured. Accordingly the OR gate 76 turns to the "L" level to thereby release the electromagnetic brake.

Subsequently, with the advance of the shutter release operation, the mirror 2 rises and a shutter (not shown) runs. Upon completion of the exposure, the AO terminal of the control circuit 73 turns to the "H" level almost simultaneously with the fall of the mirror 2 to set the FF 80. Then, the output terminal Q of the FF 80 turns to the "H" level and the output terminal of the OR gate 77 also turns to the "H" level to rotate the motor 1 again. Accordingly, as the plate cam 12 rotates, the diaphragm is driven toward its open aperture. When the plate cam 12 reaches the bottom dead point, the leaf switch 19 is closed to thereby reset the FF circuit 80. The output terminal of the OR gate 77 turns to the "L" level to interrupt the power supply to the motor 1. In addition, the inverting output terminal $\overline{Q}$ of the FF 80 turns to the "H" level and the multivibrator 87 produces the "H" level signal for a definite period. During this period, the electromagnetic brake is applied to the motor 1 and the stop-down member 13 stops at the position of the open aperture to prepare for the next shutter chance.

In the foregoing embodiment, in which the stop-down member 13 is driven by operating the gear train with the motor 1, the stop-down member 13 may be driven by a spring force and be stopped by a magnet. Further, it will be understood that with a camera which detects the number of stopping down steps based on variation of the light quantity, circuits other than that shown in FIG. 4 may be utilized.

Figure 6:
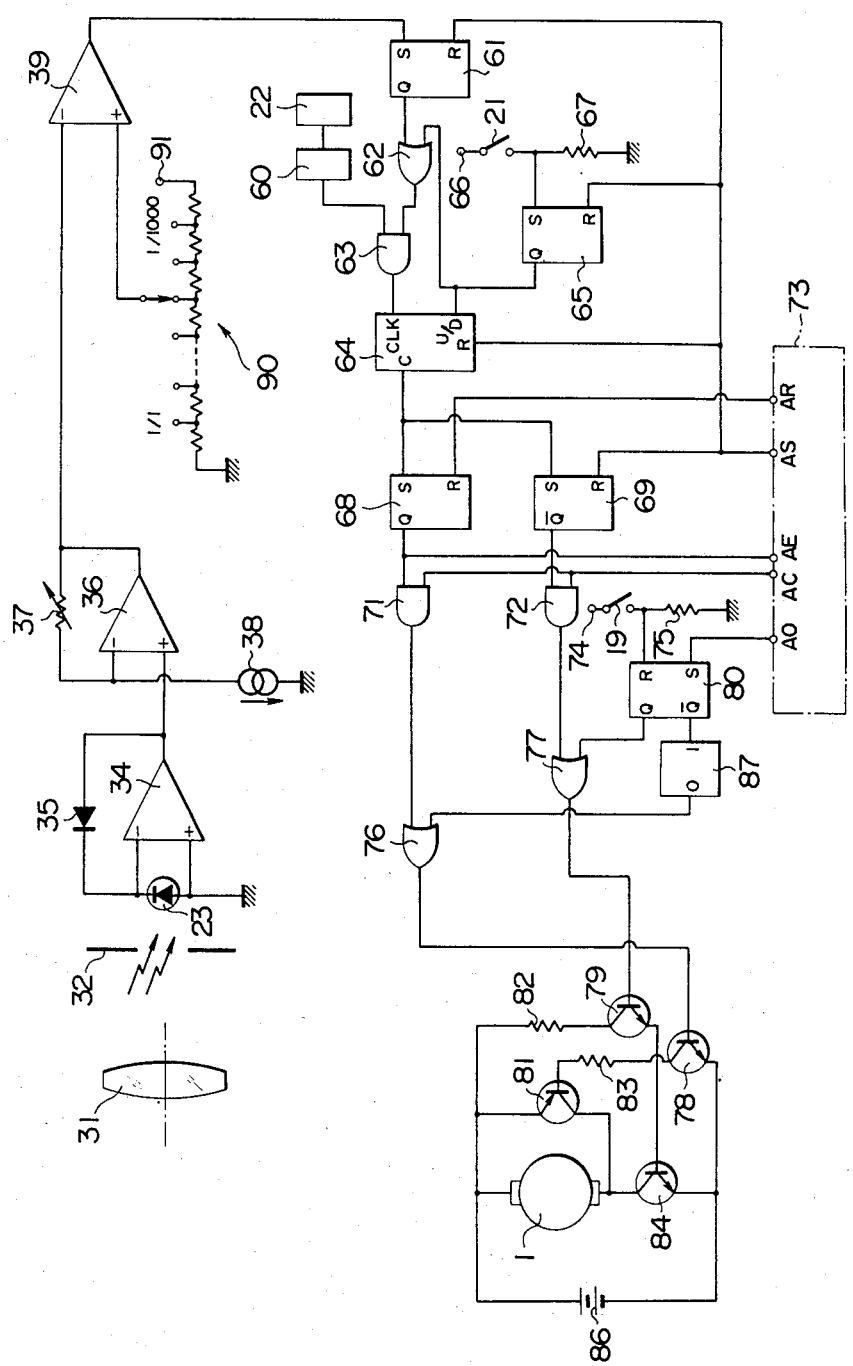
FIG. 6 is a circuit diagram of a camera of the automatic aperture control type according to another embodiment of the present invention.

While the present invention has been described above with the first embodiment applied to an automatic aperture control camera of the program type, it may be similarly applicable to an automatic aperture control camera of the shutter speed priority type. Specifically, as shown in FIG. 6, which illustrates a second embodiment of the present invention which is applied to an automatic aperture control camera of the shutter speed priority type, the stop-down voltage generator (41 to 49, 51 to 54) (FIG. 4) which is connected between the output terminal of the operational amplifier 36 and the non-inverting input terminal of the comparator 39 may be replaced by an arrangement in which a movable contact piece terminal of a variable resistor 90 is connected to a non-inverting input terminal of the comparator 39, the variable resistor having a plurality of intermediate contacts and being connected between a terminal 91 connected to a power supply and the ground for setting a shutter speed.

The construction of the camera according to the second embodiment other than the foregoing arrangement is similar to that of the camera of the first embodiment shown in FIGS. 3, 4. Therefore, mechanisms of the second embodiment will not be described and illustrated. As for an electric circuit thereof, like reference characters have been added to FIG. 6 to like members and a detailed description will be omitted.

According to the aperture control camera of the second embodiment, a definite voltage corresponding to a shutter speed is applied to the non-inverting input terminal of the comparator 39 by presetting the shutter speed with the variable resistor 90 so that the aperture to be set is determined by a voltage corresponding to information of a light quantity which is applied to the inverting input terminal of the comparator 39. Namely, the diaphragm aperture is determined in accordance with brightness of an object to be photographed under the condition that a shutter speed has been previously set. Thus, an aperture control of the shutter speed priority type is achieved.

Figure 7:
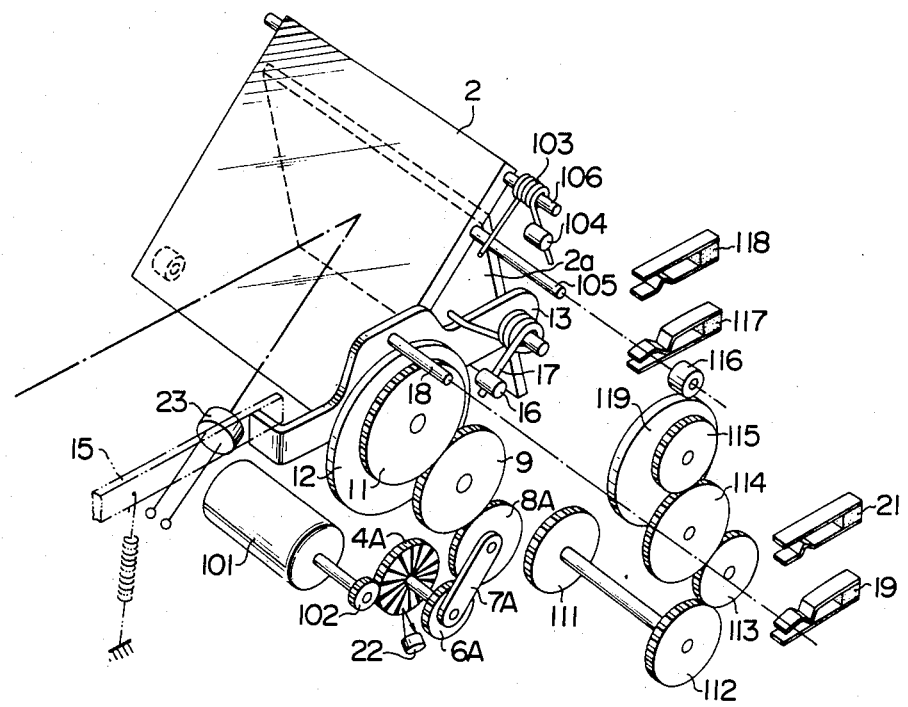
FIG. 7 is an enlarged perspective view of the essential parts of a camera of the automatic aperture control type according to a further embodiment of the present invention.

In FIG. 7, which illustrates an automatic exposure control camera according to a third embodiment of the present invention, a reversible motor 101 for driving a diaphragm is disposed below the main movable mirror 2. An output gear 102 is integrally mounted on an output shaft outwardly extending from the motor 101. The gear 102 engages an intermediate spur gear 4A. A sun gear 6A is integrally mounted on a rotary shaft of the gear 4A. The sun gear 6A engages a planet gear 8A through an arm 7A. The planet gear 8A engages an idle gear 9 during the forward rotation of the motor 101. With the foregoing arrangement, an output of the motor 101 in the forward rotation permits the plate cam 12 to operate through a set of gears 102, 4A, 6A, 8A, 9 and 11 to drive the stop-down member 13.

A set of gears including sun gear 6A, arm 7A and planet gear 8A constitutes a clutch mechanism. When the motor 101 is reversely rotated, the planet gear 8A is disengaged from the idle gear 9 and engages a gear 111, which drives a gear 115 through a set of gears including a gear 112 which is integrally mounted on the same shift with gear 111 in a coaxial relationship therewith, a gear 113 and a gear 114 in order. A disc- or oval-shaped plate cam 119 for driving the mirror 2 is eccentrically attached to the gear 115. A roller 116 which will be described later bears against the peripheral surface of the plate cam 119.

Two pins 105, 106 are secured to the front side surface of the main movable mirror 2 in its upper part. A torsion spring 103 is mounted on the pin 106 and has one end attached to the pin 105 and the other end attached to a stationary pin 104 so as to urge the mirror 2 downwardly. The roller 116 is rotatably mounted on the front end of the pin 105 in such a manner that when the plate cam 119 reaches its bottom dead point a normally-open type leaf switch 117 is closed and when the plate cam 119 reaches its top dead point another normally-open type leaf switch 118 is closed.

Figure 8A:
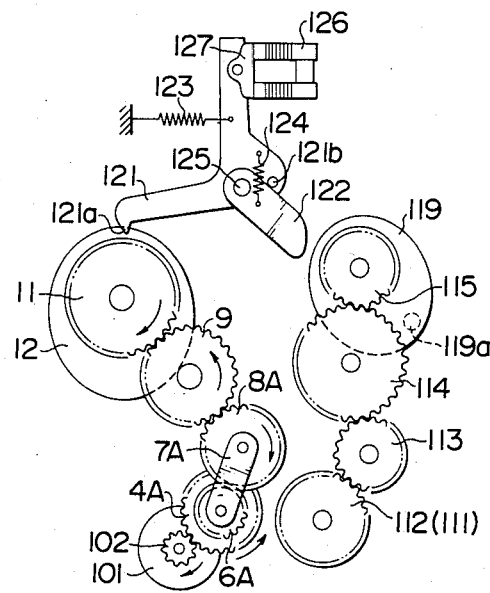
FIGS. 8A to 8C are side views of the camera shown in FIG. 7 which is in operation.

Further, as shown in FIG. 8A, a bell crank-shaped lever 121 is arranged on the upper part of the gear 11. The lever 121 is urged to rotate counterclockwise about a stationary stub 125 by a coiled spring 123 which has one end secured to the camera body. A pawl 121a is projectedly provided on the free end of an arm of the lever 121 which obliquely extends downward. An armature 127 formed of small pieces such as soft iron is mounted on the other arm of the lever 121. A well known combination magnet 126 comprising a combination of a permanent magnet and an electromagnet is disposed in opposing relationship with the armature 127 so that when a current is interrupted the suction force is generated and when a current is applied the suction force disappears. An arm 122 has its one end rotatably mounted on the stationary stub 125.

A coiled spring 124 which has a stronger tension than that of the spring 123 is provided between a substantially middle part of the arm 122 and the center bent part of the lever 121. Thus, the arm 122 is urged counterclockwise about the stub 125 and is normally in abutment against a stop 121b. The side plane of the other end of the arm 122 is formed in an inclined plane so as to smoothly engage a short pin 119a which is secured to the lower right side plane of the plate cam 119.

Those members of the camera according to the third embodiment of FIG. 7 which have not specifically been referred to are constructed in a manner similar to the first embodiment of FIG. 3 and like reference characters have been added to FIG. 7 to like members of the camera. A detailed description of these members will be omitted. The electric circuit of the camera of the third embodiment, except that the motor and its control circuit are reversibly constructed and a control circuit for the combination magnet is further added, is substantially similar to the electric circuit of the camera of the first embodiment of FIG. 4 and a detailed description and illustrations of the electric circuit will be omitted.

In operation, when a release button (not shown) is depressed, as shown in FIG. 8A, the motor 101 rotates clockwise in the forward direction and its rotating effort is transmitted successively to the directions indicated by arrows to finally rotate the gear 11 and the plate cam 12 clockwise. Simultaneously, the stop-down member 13 is also driven upwardly to initiate the stop-down operation. When a definite aperture is determined, the counter 64 initiates the counting.

Shortly, when the minimum aperture (the top dead point) is achieved, the leaf switch 21 turns on and the counter 64 initiates the count-down operation. When the number stored in the counter 64 comes to the 0 count, the motor 101 is stopped by an electromagnetic brake and a current flows in the combination magnet 126 which is controlled by a proper control circuit to release the armature 127 from the suction. Then, since the lever 121 is drawn by the spring 123, the lever 121 rotates counterclockwise about the stub 125 and the pawl 121a of the lever 121 engages a portion between teeth of the gear 11. As a result, the gear 11 is firmly fixed. The plate cam 12 also becomes in a fixed condition so that it does not move even when being subject to a force from the diaphragm lever 15 (see FIG. 7) which is in cooperation with the diaphragm of the interchangeable lens.

Figure 8B:
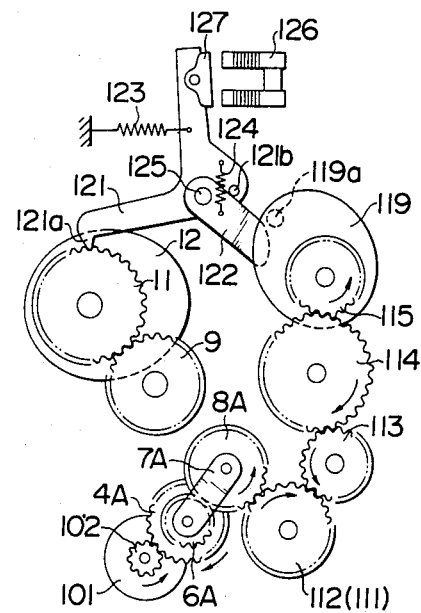

Subsequently, as shown in FIG. 8B, when the motor 101 is reversely rotated counterclockwise, the clutch mechanism is switched so as to allow the planet gear 8A to engage the gear 111. Then, a set of the gears 112, 113, 114, 115 rotate successively. Finally, the plate cam 119 rotates while the plate cam 119 bears against the roller 116 (see FIG. 7) and the main movable mirror 2 begins to rise. When the plate cam 119 reaches the top dead point, the leaf switch 118 which bears against the front end of the pin 105 is closed and the motor 101 stops with application of the electromagnetic brake.

Figure 8C:
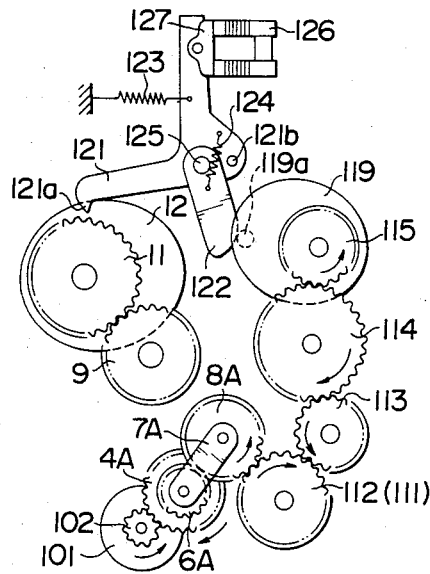

When a shutter (not shown) runs and the exposure is completed with the advance of the shutter release operation, the motor 101 again rotates counterclockwise and the plate cam 119 rotates from the top dead point to the bottom dead point. Namely, the mirror 2 begins to fall. Meanwhile, as shown in FIG. 8C, the pin 119a bears against the arm 122 to rotate it clockwise. The lever 121 also rotates clockwise against the resilience of the spring 123 and the pawl 121a is disengaged from the gear 11. Accordingly, the armature 127 is brought into abutment with the magnet 126 and is attracted thereto. Further, while the plate cam 119 rotates to keep urging the arm 122, both the pin 119a and arm 122 will part from each other in the course of the rotation. Then, the mirror 2 completes falling at the bottom dead point of the plate cam 119. The leaf switch 117 is closed by the pin 105 and the motor 101 stops with application of the electromagnetic brake.

Subsequently, the motor 101 resumes rotating clockwise and as the plate cam 12 rotates toward the bottom dead point, the diaphragm is driven toward its open aperture. When the stop-down member 13 reaches the bottom dead point, the leaf switch 19 is closed and the stop-down member 13 stops at the open aperture position with application of the electromagnetic brake to the motor 101.

What is claimed is:

1. A camera of the automatic aperture control type comprising:
   stop-down means which permits a diaphragm provided on an interchangable taking lens barrel which is initially stopped-down from its open aperture to its minimum aperture in cooperation with a shutter release operation and thereafter opened from said minimum aperture towards said open aperture;
   electronic means for generating a first signal representative of the changing diaphragm aperture responsive to the stop-down operation of said stop-down means and a second signal representative of the changing diaphragm aperture responsive to the opening operation of said stop-down means;
   a photometric circuit which measures the light of object to be photographed passing through said diaphragm and produces information on the measured light quantity;
   means responsive to the photometric circuit for generating a variation signal representing a variation in the diaphragm aperture;
   an aperture decision circuit responsive to the variation signal and the measured light quantity information for generating an aperture selection signal when the light quantity being measured and the diaphragm aperture variation signal reach a predetermined relationship;
   storage means responsive to the aperture selection signal for storing said first signal which represents the position occupied by said stop-down means when said diaphragm assumes said diaphragm aperture to be set during the stop-down operation; and
   stop means responsive to said stored first signal and said secod signal reaching a predetermined relationship for stopping said stop-down means at a position occupied by said stop-down means when said diaphragm resumes the position represented by the first signal stored in said storage means, said stop means operating during said opening operation of said stop-down means towards said open aperture.

2. A camera of the automatic aperture control type comprising:
   stop-down means which permits a diaphragm provided on an interchangable taking lens barrel to be initially stopped-down from its open aperture to its minimum aperture in cooperation with a shutter release operation and thereafter to be opened from said minimum aperture towards said open aperture;
   a photometric circuit which measures the light of an object to be photographed passing through said diaphragm and produces information on the measured light quantity;
   an aperture decision circuit which determines a diaphragm aperture to be set based on said information on the measured light quantity;
   storage means for storing the position occupied by said stop-down means when said diapragm assumes said aperture to be set during said stop-down operation;
   stop means for stopping said stop-down means at said position occupied by said stop-down means when said diaphragm resumes the position stored in said storage means during said opening operation towards said open aperture;
   said stop-down means being operated by means of a drive mechanism comprising a drive motor, a gear train for reducing an output speed of said drive motor, a movable plate cam which is in cooperation with said gear train and a follower pin which is secured to said stop-down means and bears against said plate cam.

3. A camera of the automatic aperture control type according to claim 2, having a second gear train and in which said drive motor is a reversible motor and, when in reverse rotation, is switched from said first mentioned gear train to said second gear train through a clutch mechanism to drive a main movable mirror of the camera.

4. A camera of the automatic aperture control type according to claim 2, in which said drive mechanism further includes a rotary encoder for determining the position of said stop-down means by detecting the number of rotations of said drive motor.

5. A camera of the automatic aperture control type according to claim 2, in which said plate cam permits said stop-down means to stop down the diaphragm while a point where said plate cam bears against said follow pin is transferred from the bottom dead point of said plate cam to the top dead point thereof and to open the diaphragm while said point is transferred from said top dead point to said bottom dead point.

6. A camera of the automatic aperture control type comprising:
   stop-down means which permits a diaphragm provided on an interchangable taking lens barrel to be initially stopped-down from its open aperture to its minimum aperture in cooperation with a shutter release operation and thereafter opened from said minimum aperture towards said open aperture;
   electronic means for generating a first signal representative of the diaphragm aperture during the stopping-down operation and a second signal representative of the diaphragm aperture during the opening operation;
   a photometric circuit which measure the light for an object to be photographed passing through said diaphragm and produces information on the measured light quantity;
   an aperture decision circuit which determines a diaphragm aperture to be set based on said information on the measured light quantity;
   electronic storage means coupled to said electronic means for storing said first signal which represents a position where said stop-down means lies when said diaphragm assumes said aperture to be set during said stop-down operation; and stop means responsive to said second signal and the contents of said storage means for stopping said stop-down means at a position occupied by said stop-down means when said diaphragm resumes the position stored in said electronic storage means during the opening operation of said stop-down means towards said open aperture.

7. A camera of the automatic aperture control type according to claim 6, in which said photometric circuit includes a photoelectric transducer element for receiving said object light which passes through a semi-transparent part of a main movable mirror of the camera and which is reflected by a total reflection mirror which is disposed rearwardly of said mirror.

8. A camera of the automatic aperture control type according to claim 6, in which said aperture decision circuit comprises a variable resistor for setting a shutter speed which resistor has a plurality of intermediate contacts and a comparator which compares a voltage corresponding to a shutter speed which is produced from said variable resistor whith a voltage corresponding to said light quantity information to determine said aperture to be set in the shutter speed priority mode.

9. A camera of the automatic aperture control type comprising:

stop-down means which permits a diaphragm provided on an interchangable taking lens barrel to be initially stopped-down from its open aperture to its minimum aperture in corporation with a shutter release operation and thereafter opened from said minimum aperture towards said open aperture;

a photometric circuit which measures the light of an object to be photographed passing through said diaphragm and produces information on the measured light quantity;

an aperture decision circuit which determines a diaphragm aperture to be set based on said information on the measured quantity;

storage means for storing the position occupied by said stop-down means when said diaphragm assumes said aperture to be set during said stop-down operation;

stop means for stopping said stop-down means at said position occupied by said stop-down means when said diaphragm resumes the position stored in said storage means during said opening operation when said stop-down means moves the diaphragm towards said open aperture;

said storage means including a counter for counting pulse signals which are produced in cooperation with operation of said stop-down means.

10. A camera of the automatic aperture control type according to claim 9, in which said counter performs the count-up operation of said pulse signals for the period from the time the diaphragm assumes said aperture to be set to the time the diaphragm is stopped down to the minimum aperture during the stop-down operation and performs the count-down operation of said pulse signals during said diaphragm opening operation.

11. A camera of the automatic aperture control type comprising:

stop-down means which permits a diaphragm provided on an interchangable taking lens barrel to be initially stopped-down from its open aperture to its minimum aperture in cooperation with a shutter release operation and thereafter opened from said minimum aperture towards said open aperture;

a photometric circuit which measures the light of an object to be photographed passing through said diaphragm and produces information on the measured light quantity;

an aperture decision circuit which determines a diaphragm aperture to be set based on said information on the measured quantity;

storage means for storing the position occupied by said stop-down means when said diaphragm assumes said aperture to be set during said stop-down operation;

stop means for stopping said stop-down means at said position occupied by said stop-down means when said diaphragm resumes the position stored in said storage means during said opening operation when said stop-down means moves the diaphragm towards said open apertures;

said stop means comprising a motor control circuit which interrupts a power supply to a motor for driving said stop-down means in response to an output of said storage means and simultaneously brakes the motor.

12. A camera of the automatic aperture control type according to claim 11, in which said stop means further includes detent means comprising a pawl and a combination magnet, said detent means locking said stop-down means at a position corresponding to said aperture to be set and releasing said stop-down means from said lock as a main movable mirror of the camera falls.

13. A camera of the automatic aperture control type comprising:

stop-down means which permits a diaphragm provided on an interchangable taking lens barrel to be initially stopped-down from its open aperture to its minimum aperture in cooperation with its shutter release operation and thereafter to be opened from said minimum aperture towards said open aperture;

a photometric circuit which measures the light of an object to be photographed passing through said diaphragm and produces information on the measured light quantity;

an aperture decision circuit which determines a diaphragm aperture setting based on said information on the measured light quantity;

storage means for storing the position occupied by said stop-down means when said diaphragm assumes said aperture to be set during said stop down operation;

stop means for stopping said stop-down means at said position occupied by said stop-down means when said diaphragm resumes the position stored in said storage means during said opening operation towards said open aperture;

said aperture decision circuit comprising a stop-down voltage generator in which a voltage corresponding to said information of the measured light quantity is subject to differentiation followed by integration and a comparator which compares an output voltage from said stop-down voltage generator which voltage corresponds to variation in the diaphragm aperture with a voltage corresponding to said light quantity information to determine said aperture to be set so as to satisfy predetermined program characteristics.

* * * * *